(12) United States Patent
Dumont et al.

(10) Patent No.: US 11,489,854 B2
(45) Date of Patent: Nov. 1, 2022

(54) TECHNIQUES FOR INCENTIVIZED INTRUSION DETECTION SYSTEM

(71) Applicant: NAGRAVISION S.A., Cheseaux-sur-Lausanne (CH)

(72) Inventors: Pierre Dumont, Cheseaux (CH); Frederic Thabaret-Diebold, Cheseaux (CH); Cristian Ruiz, Cheseaux (CH); Riccardo Sueca, Cheseaux (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 161 days.

(21) Appl. No.: 16/936,014

(22) Filed: Jul. 22, 2020

(65) Prior Publication Data
US 2021/0037055 A1    Feb. 4, 2021

Related U.S. Application Data

(60) Provisional application No. 62/880,587, filed on Jul. 30, 2019.

(51) Int. Cl.
*H04L 9/40* (2022.01)
*G06Q 30/02* (2012.01)
*G06F 21/00* (2013.01)

(52) U.S. Cl.
CPC ..... *H04L 63/1416* (2013.01); *G06Q 30/0207* (2013.01); *H04L 63/1491* (2013.01)

(58) Field of Classification Search
CPC . H04L 63/1491; H04L 63/14; H04L 63/1416; H04L 63/1441; G06F 21/55; G06F 21/554; G06F 21/50
See application file for complete search history.

(56) References Cited

U.S. PATENT DOCUMENTS

| | | | |
|---|---|---|---|
| 2015/0379510 A1* | 12/2015 | Smith | G06Q 20/3829 705/71 |
| 2017/0140408 A1* | 5/2017 | Wuehler | G06Q 30/0207 |
| 2018/0309777 A1 | 10/2018 | Kaplan et al. | |
| 2019/0057382 A1* | 2/2019 | Wright | H04L 9/0891 |
| 2019/0228447 A1 | 7/2019 | Macias | |

FOREIGN PATENT DOCUMENTS

WO    WO2021/019429 A1    2/2021

OTHER PUBLICATIONS

International Search Report and Written Opinion for PCT Application No. PCT/IB2020/057079 dated Sep. 14, 2020, 10 pages.
Bo Wu et al., "SmartRetro: Blockchain-Based Incentives for Distributed IoT Retrospective Detection" 2018 IEEE 15th International Conference on Mobile Ad Hoc and Sensor Systems, IEEE, Oct. 9, 2018 (Oct. 9, 2018) pp. 308-316, XP033468857, DOI: 10.1109/MASS.2018.00053.

\* cited by examiner

*Primary Examiner* — Edward Zee
(74) *Attorney, Agent, or Firm* — Polsinelli LLP

(57) ABSTRACT

The present disclosure relates generally to security solutions. More specifically, techniques (e.g., systems, methods, and devices) are provided to implement an incentivized-based intrusion detection system to detect malicious acts against an asset. The incentive may lure or facilitate the actor to provide information detecting malicious actions against an asset.

20 Claims, 10 Drawing Sheets

TECHNIQUES FOR INCENTIVIZED INTRUSION DETECTION SYSTEM

CROSS-REFERENCE TO RELATED APPLICATIONS

This application claims the benefit of U.S. Provisional Application No. 62/880,587, filed Jul. 30, 2019, which is hereby incorporated by reference, in its entirety and for all purposes.

FIELD

The present disclosure relates generally to security solutions. More specifically, techniques (e.g., systems, methods, and devices) are provided to implement an incentivized-based intrusion detection system to detect malicious acts against an asset. The incentive may lure or facilitate the actor to provide information detecting malicious actions against an asset.

SUMMARY

Techniques for incentivized intrusion detection are described herein, which can provide security solutions for one or more systems (e.g., an information technology system). Two common types of security solutions are detection-based (e.g., intrusion detection system, antivirus, endpoint detection and response, etc.) and using lures (e.g., honeypots). The detection-based systems try to detect a malicious actor's (e.g., a device being used by a person) presence by using traces left on compromised systems, suspicious network traffic, and/or suspicious activities. This detection-based solution is based on comparing signatures against a database of malicious signatures. Any unknown executable with a new signature will not be detected. Suspicious network activities provide a high false positive rate due to the overlap of malicious and benign actions.

Lure-based systems, such as honeypot systems, try to lure malicious actors to reveal their presence by mimicking a real system. A honeypot system or other lure-based system has no valuable information, and any access to such a system is monitored by the system and/or a security team monitoring the system. Lure-based systems try to detect malicious actor's presence instead of inciting them to reveal themselves. They are often costly solutions and breach detection time are typically slow (e.g., not fast enough to detect and/or identify a malicious actor). Thus, there is a need to reduce the detection time and be alerted as soon as possible of an intrusion on a system.

The techniques for incentivized intrusion detection described herein take advantage of the fact that one of the main goals of malicious actors when hacking information technology systems is to gain money or other incentive. For example, the incentivized intrusion detection system and methods described herein incentivize a malicious actor to access an asset and thus reveal itself. Accessing an asset may include downloading the asset, reading the asset, exposing the asset, and/or the like. Instead of risking a malicious actor discovering potentially valuable information or damaging an information technology system, an incentive may be offered that the malicious actor can claim in relative anonymity. However, the presence of the malicious actor may be revealed at claiming time in order to inform the attacked party. For example, the vulnerability of the system may be detected and information may be obtained relative to the vulnerability when the asset is maliciously accessed. The incentive may enable the system to obtain information in near real-time using a smart contract and a distributed ledger. The distributed ledger may enable tracking and ensures first right to claim the incentive. The incentive may further deter the malicious actor from performing malicious acts. The incentive can be reduced or improved based on further action or inaction. The incentive can be deployed internally in some cases, in which case a client of the system (e.g., a company or other user) may not attract unwanted attention from malicious actors.

The incentive may redirect the focus of the malicious actor on finding and claiming the incentive instead of damaging the attacked party. In addition, malicious actors may be tempted to claim the incentive as soon as possible because the incentive might be claimed by other malicious actors or might no longer be valid. Using distributed ledger (e.g., blockchain) technologies, the information technology system (and in some cases the security team monitoring the system) may be warned of the malicious actors' presence when the malicious actor claims an incentive via a smart contract.

Inciting malicious actors to reveal their presence may reduce the time required to detect the breach. This may be because a malicious actor is more likely to reveal itself sooner if there is an incentive available. In addition, this will reduce the cost and impact of the breach as information technology security teams may be alerted earlier than with current information technology security tools.

Certain embodiments of the present disclosure include a method. The method may include configuring a repository on a digital environment. The method may further include identifying an asset for accessing the repository configured on the digital environment by one or more devices. The method may further include generating a smart contract with the asset. In some embodiments, multiple smart contracts may be generated and may be linked or chained together. Metadata may be linked to the smart contract. The asset may include the metadata and be deployed to the repository. The method may further include deploying the smart contract on a distributed ledger. The method may further include receiving at least a portion of the metadata to trigger the smart contract to provide the asset based on accessing of the repository.

Certain embodiments of the present disclosure include a system. The system may include one or more data processors; and a non-transitory computer-readable storage medium containing instructions which, when executed on the one or more data processors, cause the one or more data processors to perform the methods described above and herein.

Certain embodiments of the present disclosure include a computer-program product tangibly embodied in a non-transitory machine-readable storage medium, including instructions configured to cause a data processing apparatus to perform the methods described above and herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
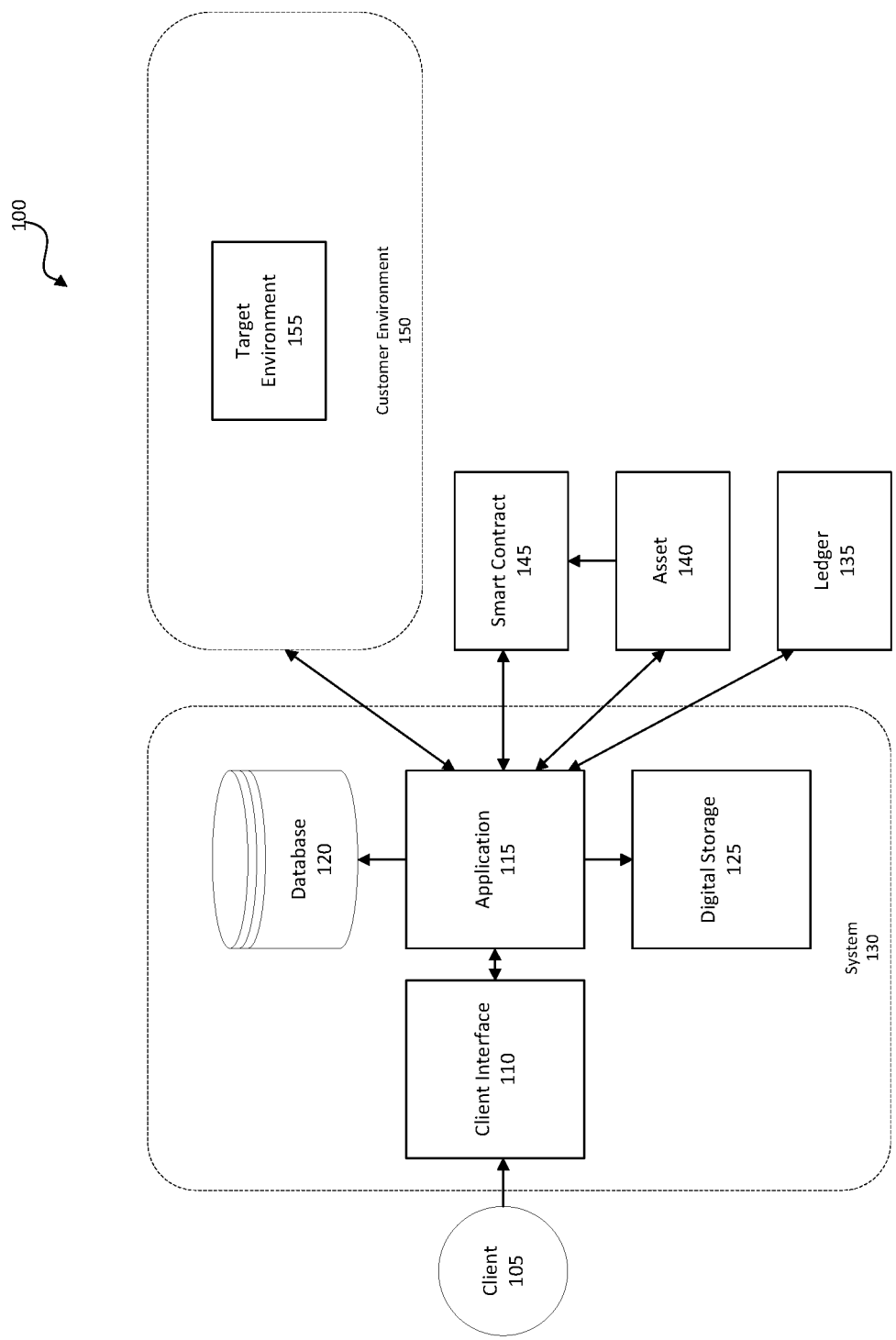
FIG. 1 shows a block diagram of a backend in an embodiment of a blockchain incentive intrusion detection system.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Systems and network security problems are common in digital environments, such as information technology systems. Breaches of access to digital information are also common in digital environments. Malicious actors may target these digital environments to gain valuable or private information, incentives, or other assets. Inciting malicious actors or intruders of information technology systems to reveal themselves is one method to learning the malicious actor's identity, method of attack, and information regarding incidences and may be achieved using a monetary incentive, recognition of their skills, or other incentives. To prove their presence, specific assets (also referred to as artefacts) may exist in the information technology systems. Assets may include valuable information (such as private information, monetized information, applications, recognition of skills, and/or the like) or any other data available in a digital environment that may incite a malicious actor. An asset can contain certain information related to an associated smart contract, such as a monetary amount, compromised information technology property, a unique fingerprint to the asset, metadata, or other information.

Smart contracts may exist on distributed ledgers (e.g., blockchains). A smart contract may be used to connect a malicious actor and the owner of an incentive, providing relative anonymity compared to traditional client-server systems. Each of the malicious actor and the owner may possess access to digital storage. The owner's digital storage may be funded with an incentive to incite the malicious actor to locate a vulnerability, and the malicious actor's digital storage may be used to claim the incentive. Each respective digital storage may be represented by a public key (e.g., a first public key in a digital storage of the attacker and a second public key in a digital storage of the owner). The public keys may be written inside a transaction and identify the sender of the transaction. For example, the owner's digital storage may be used to move the necessary incentive to the smart contract, which may act as a deposit. The malicious actor's digital storage may be used to claim the asset and receive the incentive from the smart contract. Using the unique components of the asset, only those who found the asset may claim the incentive through the smart contract. Determining the legitimacy of the claimant can be mathematically verifiable using the information in the asset, and the smart contract would not allow guessing of the information in the asset.

Challenges exist in providing such a system. First, the asset required to prove an malicious actor is present in the information technology network must be defined. Second, the asset must be deployed on a heterogeneous information technology system. Heterogeneous information technology systems may include physical or virtual servers with assets deployed at the operating system level, assets deployed on applications, assets deployed on online or offline information technology systems, and assets deployed on lower levels (e.g., the chip level). Third, the smart contract must be defined with terms, conditions, and metadata to claim the monetary incentive. Fourth, assets, incentives, and smart contract must be managed. Fifth, the distributed ledger where the smart contract resides and is executed must be monitored.

Current security solutions fail to detect unusual malicious activity in a timely manner, or are delayed or inaccurate. However, attackers will try to create new attack vectors (e.g., attack paths through an IT system) and modify old ones to bypass traditional security solutions. This creates a continuous race between creating new attack vectors and improving the attack definitions for detecting attacks.

As noted above, two common types of security solutions are detection-based (e.g., intrusion detection system, antivirus, endpoint detection and response, etc.) and lure-based systems (e.g., honeypots). The detection-based systems try to detect an attacker's presence by using traces left on compromised systems, suspicious network traffic, and/or suspicious activities. A detection-based solution can compare signatures against a database of malicious signatures to detect any malicious activity. Any unknown executable with a new signature will not be detected. Suspicious network activities provide a high false positive rate due to the overlap of malicious and benign actions.

Lure-based systems, such as honeypot systems, attempt to lure attackers to reveal their presence by mimicking a real system. However, a honeypot system or other lure-based system has no valuable information, and any access to such a system is monitored by the system and/or a security team monitoring the system. Lure-based systems try to detect an attacker's presence instead of inciting them to reveal themselves. Such systems can be costly and breach detection times are typically slow (e.g., not fast enough to detect and/or identify an attacker).

Another type of security solution is based on behavior analysis which tries to detect abnormal activities. However, classifying suspicious activities is a hard task due to the overlap of malicious and benign actions. Those tools often have a high false positive rate. Therefore, a final decision by a human operator is often required to improve the classification rate.

Bug bounty programs only incite white hats to participate as they need to reveal their identity. In addition, the scope of their attacks is well defined by the organizers and often limited in time.

These and other problems and challenges may be solved by implementing one or more incentivized intrusion detection techniques described herein. Embodiments of such a system may allow a client to create bounties where they define the number of assets and incentives proposed. Afterwards, the client may configure one or more target environments supported by the incentivized intrusion detection system. Once a target environment is configured, the incentivized intrusion detection system may create and provision one or more sub-storages with one or more tokens from the main digital storage to be used for the incentives. A smart contract can then be deployed on the target environment, and transactions on the smart contract may be written to a distributed ledger (e.g., a blockchain). The smart contract can be used to handle a malicious actor's incentive claims. One or more assets can also be deployed on the target environment. The system can monitor claiming activities (e.g., whether any incentives have been claimed) on the distributed ledger to raise alerts when needed.

FIG. 1 shows a block diagram of a backend in an embodiment of an incentivized intrusion detection system. A client 105 may access the system 130 via a client interface 110 (also referred to as a user interface or a graphical user interface). The client 105 may be any suitable operator of the incentivized intrusion detection system, such as a system administrator, information technology specialist, or anyone else who has access to a digital environment. The client interface 110 may be any suitable interface, such as a display, that is in operable communication with the application 115. The application 115 may have access to a database 120. The database 120 may include records of attacks, funds made to digital storage 125, or any other data useful to the application 115. The application 115 may provide the client 105 with access to the digital storage 125. The digital storage 125 may be configured to be funded by the client 105 in order to create incentives to be provisioned on a smart contract 145. The smart contract 145 may be deployed on a distributed ledger 135 in a client system 150, which may include servers, databases, subnets, and/or other online and/or offline digital environments that may be targeted by a malicious actor. For example, one asset may be deployed on one target environment 155, while multiple assets may be deployed in various physical, virtual online, or offline information technology systems in the client system 150. Transactions on the smart contract 145 may be written to a distributed ledger 135.

Using a distributed ledger 135 and smart contract 145, pseudo-anonymity can be provided for a malicious actor and a guarantee may be made that an incentive is available to be claimed. The incentive may be, for example, a monetary award available to be digitally transferred, an information incentive, such as private or valuable data, or a recognition incentive, such as an incentive that recognizes the efforts of the malicious actor. In some cases, the malicious actor does not need to interact with any elements other than the distributed ledger 135, the smart contract 145, and the asset 140 to claim the incentive.

Linking the smart contract 145 and the asset 140 with cryptographic algorithms (e.g., associated with the distributed ledger 135) can guarantee that only a malicious actor on the specific client system 150 can claim the incentive associated with the smart contract even though the smart contract 145 may be public. The smart contract 145 and the asset 140 may be built in such a way that replay attacks (i.e., repeat attacks for the same incentive) may not be possible. In addition, the asset cannot be forged and modified to claim another incentive. For instance, the asset can include a nonce, an identifier (e.g., identifying the asset location), and an address of the smart contract 145. In one illustrative example, the asset can be composed by a concatenation of the nonce, the identifier, and the smart contract 145 address. The asset data may then be signed (and in some cases hashed) with the contract owner's private key, where the owner is the digital storage 125 that generated the smart contract 145. The smart contract 145 may have the duty to verify that the signature is correct (e.g., that the asset 140 is linked to the smart contract 145). The signature verification may be done with the owner's public address that is stored inside the smart contract 145 during the creation phase, as described further herein. The nonce and the smart contract 145 address may be used to avoid replay attacks, while the identifier may identify the asset's location, allowing the client 105 to know which target environment 155 is compromised.

The attacker and the client 105 may be put in relation through the smart contract 145. When an incentive is claimed, the client 105 may know only the malicious actor's digital storage and that the target environment 155 in the client system 150 is compromised. The client 105 may decide the properties of bounties (e.g., collections of incentives) to incite the malicious actors to reveal themselves.

Alerts may be triggered automatically as the properties of the distributed ledger 135 may guarantee that when an incentive is claimed through its smart contract 145 by a malicious actor, this transaction is recorded on the distributed ledger 135. The distributed ledger 135 can be monitored by an application (e.g., an activities manager of the application) of the incentivized intrusion detection system, as described further herein. The transaction associated with the claiming of an incentive cannot be revoked, denied, or modified as it is recorded to the distributed ledger 135. Thus, by providing an incentive, the time to detect an intrusion can be reduced, because the presence of the attacker is detected through monitoring of the distributed ledger 135 as soon as an incentive is claimed.

Figure 2:
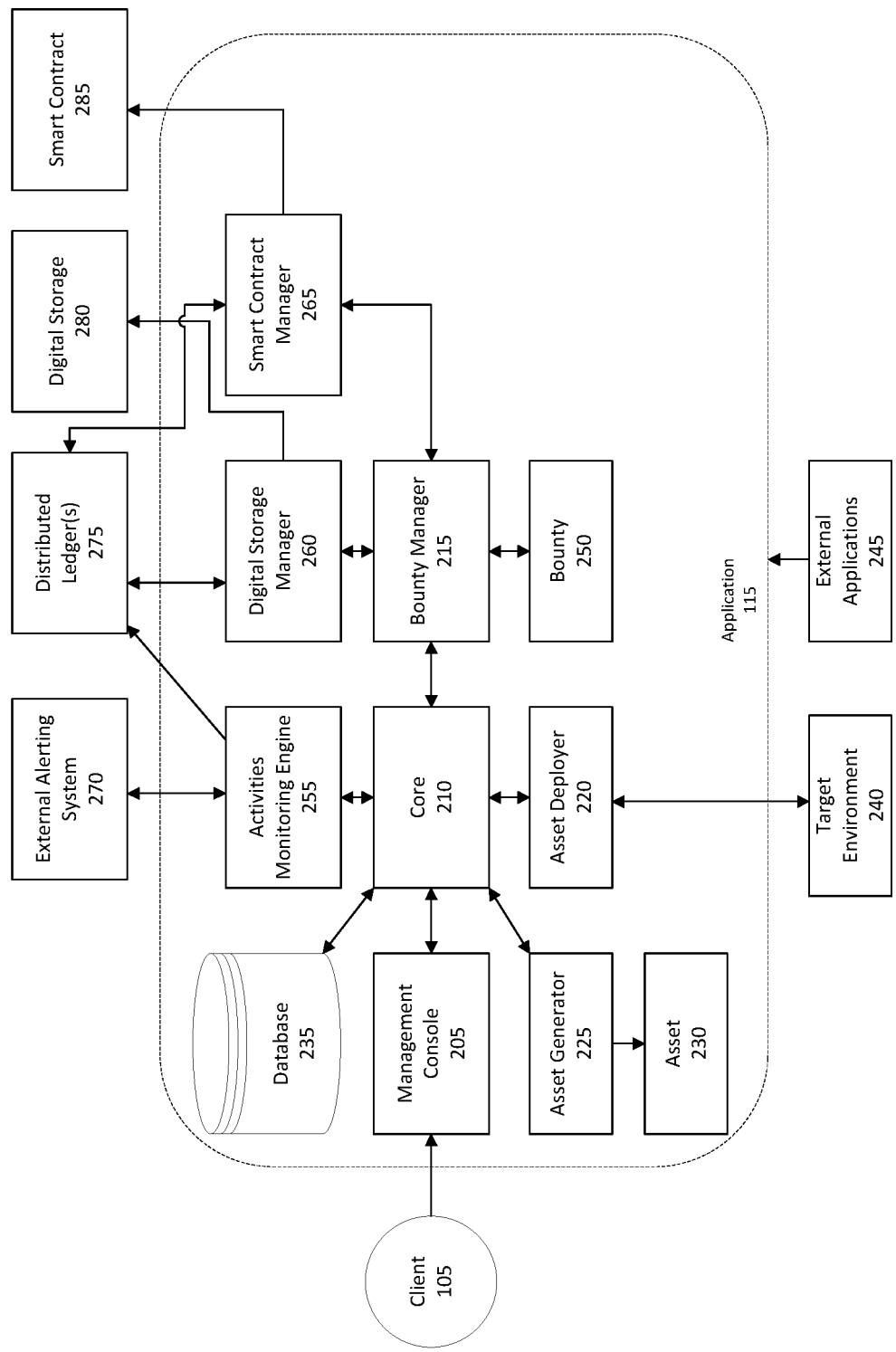
FIG. 2 shows a block diagram of an application in an embodiment of a blockchain incentive intrusion detection system.

FIG. 2 shows a block diagram of an application in an embodiment of an incentivized intrusion detection system. As shown in FIG. 2, client 105 is a user of the application 115. The client 105 may interact with the application 115 through the management console 205. The client 105 may create and manage one or more active bounties, provision funds to the digital storage, and monitor and react to an alert triggered by an activities monitoring engine 255 (described in more detail below). Multiple roles may be possible to segregate the usage of the application 115 and avoid a client from stealing an incentive. For example, an auditor may audit the application's usage as far as which user deployed how many assets with the incentive amount. A monitor may have access to the alert triggered via the activities monitoring engine 255. A finance officer may have access to the digital storage manager 260 and can provision funds. An administrator may create and deploy asset(s) and define target environment(s). The administrator may receive funds from a client with the finance officer role. An administrator may be a highly trusted user with high security settings that can be configured to separate deploying asset(s) and defining target environment(s), ensuring no one knows where and when an incentive is deployed. If enough target environments are defined, a deployment can be defined without knowledge of the exact whereabouts of the asset. A root account may have all rights on the application and may be used during initial setup of the application. The root account may be used as last usage. Any usage of this account may be flagged to the auditor and the monitor.

A malicious actor (not shown) may be the target of the incentivized intrusion detection system. The malicious actor may be an individual using a computing device to attack a target environment 240 or a group of individuals using one or more computing devices to attack a target environment 240. The system may try to incite the malicious actor to reveal his presence with one or more incentives. The reveal process may be handled using one or more smart contracts 285 which may guarantee the pseudo-anonymity of that malicious actor using asymmetric key(s) to claim one or more incentives. The incentive may represent monetary and utility token(s) from various distributed ledger(s) 275. Incentive(s) may be the token(s) claimable from the smart contract(s) 285.

An asset 230 may be the proof that the malicious actor must provide when he claims an incentive using the smart contract 285. For example, the asset 230 may be the required data to claim the incentive associated with the asset 230 through the smart contract 285. In some cases, multiple assets may be linked to one smart contract 285 and deployed on the same target environment 240. The smart contract 285 can be associated with a stage. A stage may be associated with a bounty (e.g., bounty 250). As described in more detail below, a bounty can include one or more stages, with each stage being claimable after a previous stage in a bounty. In some cases, a stage may have multiple assets. In some cases, one asset may be linked to one specific stage. Each stage can be associated with a unique smart contract (e.g., a first stage associated with smart contract 285, a second stage associated with another smart contract, and so on). A smart contract will define the step(s) or parameter(s) needed to claim one or more incentives included in the smart contract using an asset of that stage. The asset may contain information to find the appropriate smart contract 285 and metadata such as the incentive amount and/or the duration of the validity of the incentive. For example, the duration of validity can be made short (e.g., 30 minutes with rotation of the incentive on the target environment) to incite the malicious actor to reveal itself quickly. In order to avoid anyone else from using the asset 230 to claim the incentive, asymmetric cryptographic and hashing algorithm(s) may be used. A hashing protocol may be used to hash the asset's metadata. The resulting hash may be signed with the contract owner's private key. The contract may use the owner's public key (i.e., its address) to check the validity of the signature (hence, asymmetric cryptography). Any change of the asset metadata may modify the hash and invalidate the signature.

A smart contract 285 may represent the terms and condition(s) between parties and may reside in a distributed ledger 275. The distributed ledger 275 can include any suitable distributed ledger, such as a blockchain, Ethereum or another distributed ledger. In addition, the distributed ledger 275 may automatically make verifications and execute any type of operation(s) that could be triggered by meeting some conditions. A smart contract 285 may link the asset 230 to the incentive (or multiple incentives in some cases). When the malicious actor finds the asset 230, the computing device used by the malicious actor can provide the asset 230 to the associated smart contract on the distributed ledger 275 to claim the incentive. When a malicious actor claims the incentive using the smart contract 285 with the appropriate parameter(s) (e.g., metadata), the incentive may be transferred to a malicious actor's digital storage (from the digital storage 280), and the transaction may be written on the appropriate distributed ledger 275. To facilitate the transfer of the incentive to the malicious actor's digital storage, a script to claim the incentive may be included with the asset 230. In this case, a script may include the command(s) that may be executed by a malicious actor to claim the incentive using the metadata as parameter(s). The malicious actor may recreate his own equivalent script if he does not trust one. The malicious actor may also execute the script on the target environment or on a machine controlled by the malicious actor.

Several options may be chosen by the client 105 to limit the smart contract 285 and incite the malicious actor to claim the incentive as soon as possible. For example, the value of the incentive may be lowered over time, the incentive may be limited in time (e.g., a duration for which the incentive is valid may be set to a particular value), and the like. In addition, the asset may be rotated. Regularly, the asset may be invalidated on the current target environment and another asset in the same target environment may be deployed, i.e., not in the exact location on the target environment, forcing the malicious actor to search for it again.

In some cases, the smart contract 285 may not necessarily contain the full amount of incentive(s). For instance, using a token as an example of an incentive, the smart contract 285 may need to contain at least a number of tokens required for the asset with the biggest incentive amount. The application 115 may automatically provision and debit funds from the smart contract 285 when needed. For example, when an incentive is claimed using one asset 230, the application 115 may provision the smart contract 285 with the required funds for the associated incentive. In addition, the application 115 may debit funds from the smart contract 285 if the assets are invalidated.

As noted above, the bounty 250 may include one or more stages. Multiple bounties 250 may exist in parallel. For a bounty with multiple stages, each stage of the bounty may be claimable after a previous stage of the bounty (e.g., a first stage of the bounty can be claimed first, then a second stage of the bounty can be claimed, then a third stage, and so on). Each stage may be associated with a unique smart contract (e.g., smart contract 285), with each smart contract defining the steps of parameters (e.g., metadata) needed to claim the one or more incentives it includes using one of the assets of the stage. In some cases, advanced stage(s) may be used, where an advanced stage can require third party verification to liberate the incentive. The third parties may have the decision making capability to liberate the funds or not depending on the quality of the report provided by the malicious actor. This may require the third party to maintain a trusted relation with the actor(s) in the system.

In some examples, there can be two types of digital storage 280, including main digital storage and sub-storage. A main digital storage may be linked to one bounty 250. A sub-storage may be linked to one stage of the current bounty 250. A digital storage (a main digital storage or a sub-storage) from the digital storage 280 may include token(s) of a specific distributed ledger 275, which can be associated with one stage of the bounty 250, as described above. The client 105 may send funds to the main digital storage. A sub-storage may be associated with a smart contract 285 that is created by the bounty 250 when the bounty is created. When a sub-storage is used to deploy a smart contract 285, it becomes the owner of the smart contract 285.

Target environment 240 may be where the asset is deployed using the asset deployer 220. This may represent one or more information technology entities such as computer(s), server(s), database(s), smartphone(s), remote cloud instance(s) (e.g., Amazon Web Services (AWS) server(s)), mail server(s), and the like, or file(s) and software to be deployed manually by the client 105.

The distributed ledger 275 may be a decentralized database that can be managed by various participant(s). There may be no central authority that acts as arbitrator or monitor. A blockchain may be a distributed ledger 275 where all data is distributed to all participant(s). The distributed ledger 275 may include the smart contract(s) 285 and the digital storage 280 amounts that may be updated by transactions performed on the distributed ledger 275. Possible actions on a distributed ledger 275 may be, for example, minting (token creation), spending (transfer token(s)), and razing (claiming) token(s). One example of a distributed ledger may be a blockchain or Ethereum. Other distributed ledger(s) can also be used.

An alert may be triggered by the activities monitoring engine 255 when a malicious actor claims an incentive from a smart contract 285 of an ongoing bounty 250. The alert may be displayed on the management console 205 and may be exported or pushed to an external alerting system 270.

Client 105 and external application(s) 245 may have access to the application 115 through its programming interface, such as client interface 110 and/or an API. For example, the client 105 may query the activities monitoring engine 255 to review any alert(s) that have been triggered.

The application 115 may include the management console 205, the core 210, the database 235, the bounty manager 215, the smart contract manager 265, the asset generator 225, the asset deployer 220, the digital storage manager 260, and the activities monitoring engine 255.

The management console 205 may be one of the components of the application 115. The management console 205 may be an interface where various information from the different components of the application 115 can be displayed. For example, using the management console 205, the client 105 may create bounty 250 programs, trigger the deployment of associated asset(s) 230, temporary digital storage 280, token(s), and smart contract(s) 285, and monitor the associated smart contract(s) 285.

The core 210 may be the orchestrator responsible for coordinating all of the components of the application 115. The client 105, through the management console 205, may send request(s) to the core 210 which orchestrates and dispatches the appropriate component.

The database 235 may be the component of the application 115 that stores all configuration(s) needed by the application 115, but also information about the bounty 250 programs, asset(s) 230, alert(s), target environment(s) 240, client 105, and the like.

The bounty manager 215 may be another component of the application 115. The bounty manager 215 may be responsible for managing one or more bounties 250. According to the total funds available in the digital storage 280 based on a previous and ongoing bounty 250, the bounty manager 215 may provide to the client 105 appropriate choice(s) of bounties 250 that can be created. When the creation of a bounty (from the one or more bounties 250) is initiated, the client 105 may decide how many asset(s) 230 are to be generated by the asset generator 225. The bounty manager 215 may prompt the client 105 (e.g., through the management console 205) to send the funds to a main digital storage (from the digital storage 280) generated by the digital storage manager 260. According to a number of stage(s) chosen for a bounty, the smart contract manager 265 may be queried to create one or more adequate smart contract(s) 285 which are linked to asset(s) 230. The bounty manager 215 may keep track of the ongoing and previous bounties 250 using the database 235. As used herein, an ongoing bounty (also referred to as a current bounty) is one that has outstanding incentive(s) that have not been claimed, and a previous bounty is one for which all incentive(s) have been claimed. A previous bounty may also be a bounty that was invalidated. An invalidated bounty may automatically invalidate all asset(s).

The smart contract manager 265 may manage the smart contract(s) 285. When deploying a smart contract 285, the smart contract manager 265 includes the necessary information and metadata which are linked to the required asset 230 and are stored in the database 235. The smart contract manager 265 may use funds from a sub-storage (from the digital storage 280) dedicated to the current smart contract 285 to provision one or more incentives. The smart contract manager 265 may store information relative to the smart contract (e.g., term(s), incentive(s), metadata, etc.) in the database 235 and on one or more of the distributed ledgers 275.

The asset generator 225 may be responsible for generating the asset(s) 230, which as noted above is the required data needed to claim an incentive through a smart contract. For example, a malicious actor must provide an asset as proof to claim an incentive using a smart contract. The asset generator 225 may keep track of the generated asset(s) 230 using the database 235. When the client 105 creates a new bounty 250, he may choose the number of asset(s) 230 to generate for the bounty 250.

The asset deployer 220 may be responsible for deploying the asset 230 on the target environment 240. The asset deployer 220 may keep track of the deployed asset(s) 230 using the database 235. When the client 105 creates a new bounty 250, he may decide one or more target environment (s) (e.g., including target environment 240) on which he desires to deploy the asset(s) 230.

The digital storage manager 260 may be responsible for managing the digital storage 280. The digital storage manager 260 may track the amount remaining in the digital storage 280 and may write transaction(s) on the appropriate distributed ledger(s) 275. When a bounty 250 is created, the digital storage manager 260 may create a main digital storage (from digital storage 280) to which the client 105 is required to send funds. When the bounty 250 is created, the digital storage 280 may be created with the defined incentive (s). Those incentive(s) may be referenced in one or more smart contracts from the smart contract(s) 285 that are associated with the bounty 250. The digital storage manager 260 may store information relative to the digital storage (e.g., funding amount, etc.) in the database 235 and on the appropriate distributed ledger(s) 275.

The activities monitoring engine 255 may be responsible for monitoring the distributed ledger(s) 275 where the smart contract(s) 285 reside. When an incentive of a smart contract 285 is claimed by the malicious actor using the appropriate asset 230, the claim may trigger an alert which is forwarded to the management console 205 and/or stored in the database 235. In some cases, the activities monitoring engine 255 may forward alert(s) to external alerting system(s) 270. External alerting system(s) 270 may have access to the activities monitoring engine 255 through its application programming interface (API).

Figure 3:
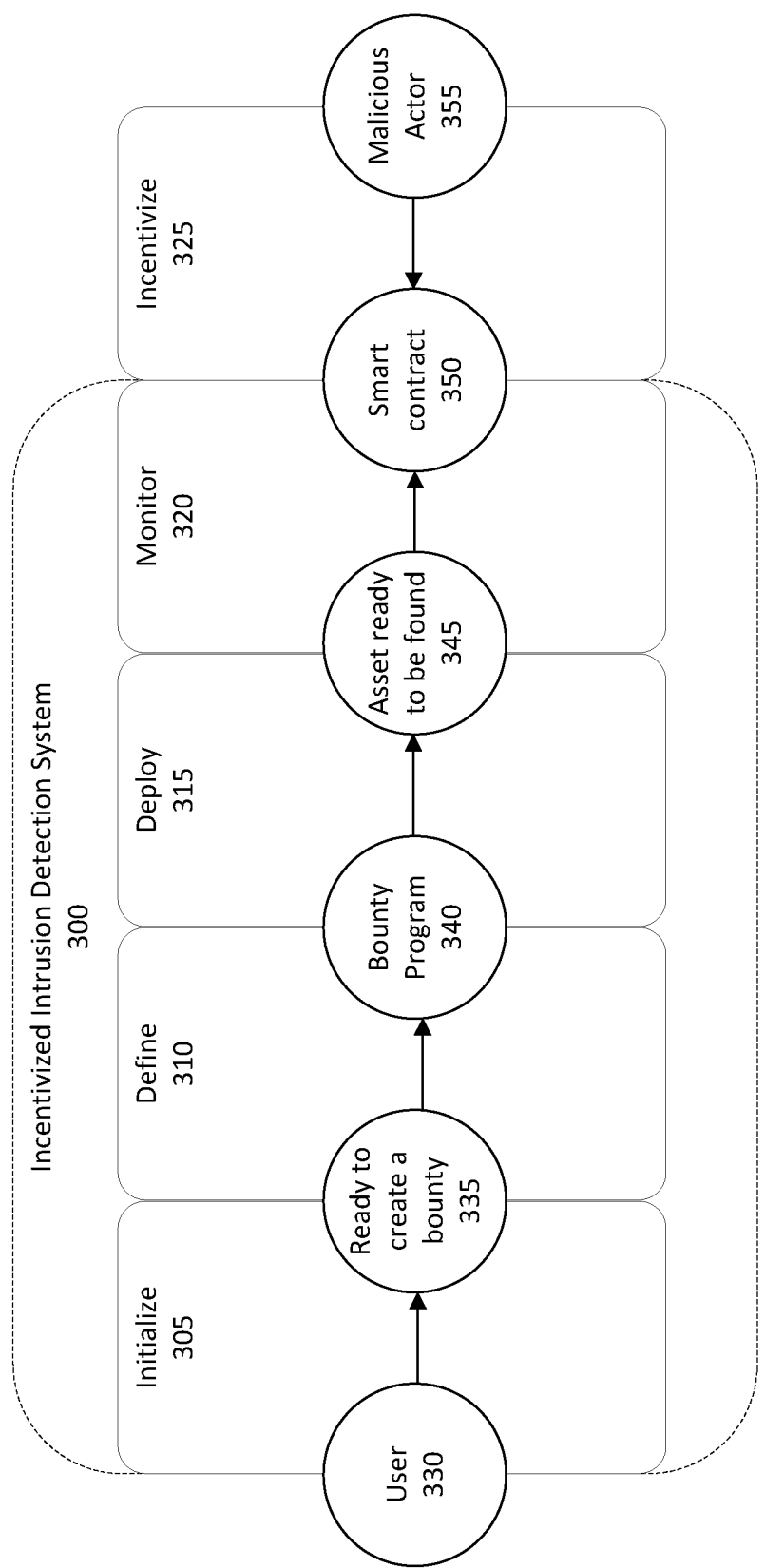
FIG. 3 shows a block diagram of a bounty creation method in an embodiment of a blockchain incentive intrusion detection system.

FIG. 3 shows a block diagram of a bounty creation method in an embodiment of an incentivized intrusion detection system. In a first step, the bounty creation is initialized at an initialization step 305 by a client 330. During the initialization step 305, the client 330 may apply application 115 configuration of the target environments, the clients and roles, and the alerting on the incentivized intrusion detection system 300. The application 115 may be configured in multiple ways: general settings and per bounty settings. Per bounty settings may be used on the application 115, such as time-to-live of the bounty program and configuration of metadata of the bounty, such as information describing the bounty's goal, on which type of target environments the assets should be deployed, the maximum amount of incentives available, and/or the like.

Some general settings may be configured before creating the first bounty. First, a target environment or multiple target environments may be defined by adding the required connection details. There are many examples of supported target environments and the information needed. In one illustrative example, on a Linux machine, the application 115 may be capable of connecting into a secure shell (SSH) protocol based connection to place the asset via a relay 415 for example, or directly from the asset deployer 220. SSH is a cryptographic network protocol for operating network services securely over an unsecured network. The SSH keys used can be linked to a client 330 that has been granted access for performing administrative functions (referred to as sudo rights). Having sudo rights may allow the following actions: placing an incentive, place an asset in the root user home directory, open a specific port and run a dummy application answering on the port as advertised on the website, broadcast the presence of the application on a multicast address, and place text files in known locations to say that there is a bounty on the machine. A similar configuration may be used on Windows machines.

Various other implementations can also be used. For example, on Kubernetes, a target environment may be a pod in a specific namespace with a specific name. In a database with credentials, the application 115 may write an asset in a specific table or schema. On a mail server, with specific e-mail accounts, the application 115 may create an e-mail with details on how to find and claim the incentive. On Amazon Web Services (AWS), Azure, Google Cloud (GCP), or other cloud providers, with API keys, the application 115 may spawn virtual machines with one or more assets deployed on each virtual machine. Manually, the application 115 may provide the client 330 with a way to download the asset so that the client 330 can place the asset. The asset may be different types, such as a file, a program, and the like. Manual placement may be optional and may allow another client to get the asset with a reduced risk.

As funds may be required to be transferred to the main digital storage when a bounty is created, the client 330 may decide to store the funds locally or in hardware storage. For example, it may be possible for the client 330 to store the tokens of the digital ledger on a software storage directly accessible from the application 115, as it handles it. Another possibility is to use a hardware storage, independent of the application 115 which has no control over it. The client may provide the hardware storage. The application 115 would request funds from the hardware storage which requires client confirmation. However, hardware storage may cause issues related to privacy as the malicious actor might get information about the bounties.

In some embodiments, an administrator may be a client 330. An administrator may decide to use multi-administrative signatures to deploy assets. When the application 115 is configured in a way that a high level of security is required, the application 115 may force the client 330 to use multi-signatures. In other words, a lone client may be forbidden to deploy assets without confirmation. Using multi-administrative signatures, a bounty is deployed only when all of the specified administrator clients agree, which avoids having only one administrator client approving the asset. The goal may be to avoid any single client 330 to deploy an asset to a known location, go there, and claim the incentive. In some embodiments, the manual deployment of an asset may be deactivated for the multi-administrative signature mode. The administrator client may decide how many bounties may be opened and how much available funds can be claimed at the same time.

Alerting may also be configured as to where the activities monitoring engine 255 sends the alerts (e.g., via short messaging service (SMS), e-mail, Transmission Control Protocol (TCP) and Transport Layer Security (TLS), etc.). In addition, fields may be configurable and may be added by the client. An administrator may create other clients of the application 115 with more or less limited rights. An administrator client may also create and revoke API keys that are used by other applications to query the various components of the application 115. The client 330 may also create network maps with different risk levels associated. The target environments may be specified with risk levels. This may allow the application to compute recommended incentives amounts and suggest which target environments assets should be deployed, in order to create a recommended pathway for the attacker.

Once initialization 305 is complete, the incentivized intrusion detection system 300 is ready to create bounties 335. The bounties may be defined at a define step 310. Defining a bounty definition may include defining of stages, assets and target environments, and the client 330 sending the required funds to digital storage. When the client 330 creates a new bounty, he may be asked to create one or more assets that will be linked to the bounty. As described previously, each bounty may have one or more stages. For example, a first stage of a bounty may be defined as the malicious actor finding the asset. The second stage of the bounty may be used to provide the malicious actor with the possibility to send a report of how the system was breached to a trusted third party. The third party may verify the correctness and can liberate the funds to the attacker (e.g., to digital storage of the malicious attacker) if the report provides enough information to fix the issue. The report may be defined by a trusted third party and may include any or all of the following information: date of breach, method of detection of vulnerability, method of exploitation of the vulnerability, other servers in the customer environment compromised, potential other issues discovered by the malicious actor, and/or the like. More stages are possible, for example, to incite the malicious actor to follow a specific path.

The number of assets for a bounty is left up to the client 330, and can be determined according to the scope the client 330 wants to set for the bounty. In one example, a bounty may cover gaining access to any computers used by employees of a target environment. In another example, a bounty can cover webservers with multiple assets deployed on them. For each asset, one or more target environments may be defined. In some embodiments, the same asset may be deployed to multiple target environments; however, only one claim of the incentive may be made. Multiple assets may be deployed on the same target environment, e.g., on the same Linux machine, on the same Kubernetes cluster, etc. The incentive amount may be decided by the client 330. The application may provide, if possible, a recommendation for the amount based on previous bounties, the type of target environment, etc. The time-to-live of the asset may also be specified. A short time-to-live may be recommended to incite the malicious actor to claim the incentive rapidly.

The client may define the smart contract related to each stage. For example, the client may decide the amount to send to the smart contract initially (e.g., with the minimum possible amount being the value of the highest incentive associated with the smart contract) and the incentive's time-to-live (i.e., how long the incentive can be claimed). The application may then create main digital storage and ask the client 330 to transfer enough funds to it to cover the incentive.

Once the token program 340 is defined at the define step 310, it may be deployed at a deploy step 315. The sub-storage per smart contract may be generated. The adequate amount of funds for the incentives may be transferred from the main digital storage to the sub-storages. The smart contracts may be deployed on the distributed ledger. The assets may be generated and deployed on the target environments.

Once the assets are deployed, the assets may be ready to be found 345 and the deployed smart contracts 350 may be monitored at a monitor step 320. Any event may be monitored by the activities monitoring engine 255. When an event related to the claim of the incentive is detected, an alert may be generated.

The assets may be deployed in such a way that learning where they might be may not be difficult for any malicious actor 355 that are aware of the system. When a malicious actor 355 finds an asset, the malicious actor 355 is incentivized at an incentivize step 325 to claim the incentive as soon as possible using the time-to-live of the asset and smart contract, as well as the incentive amount.

Figure 4:
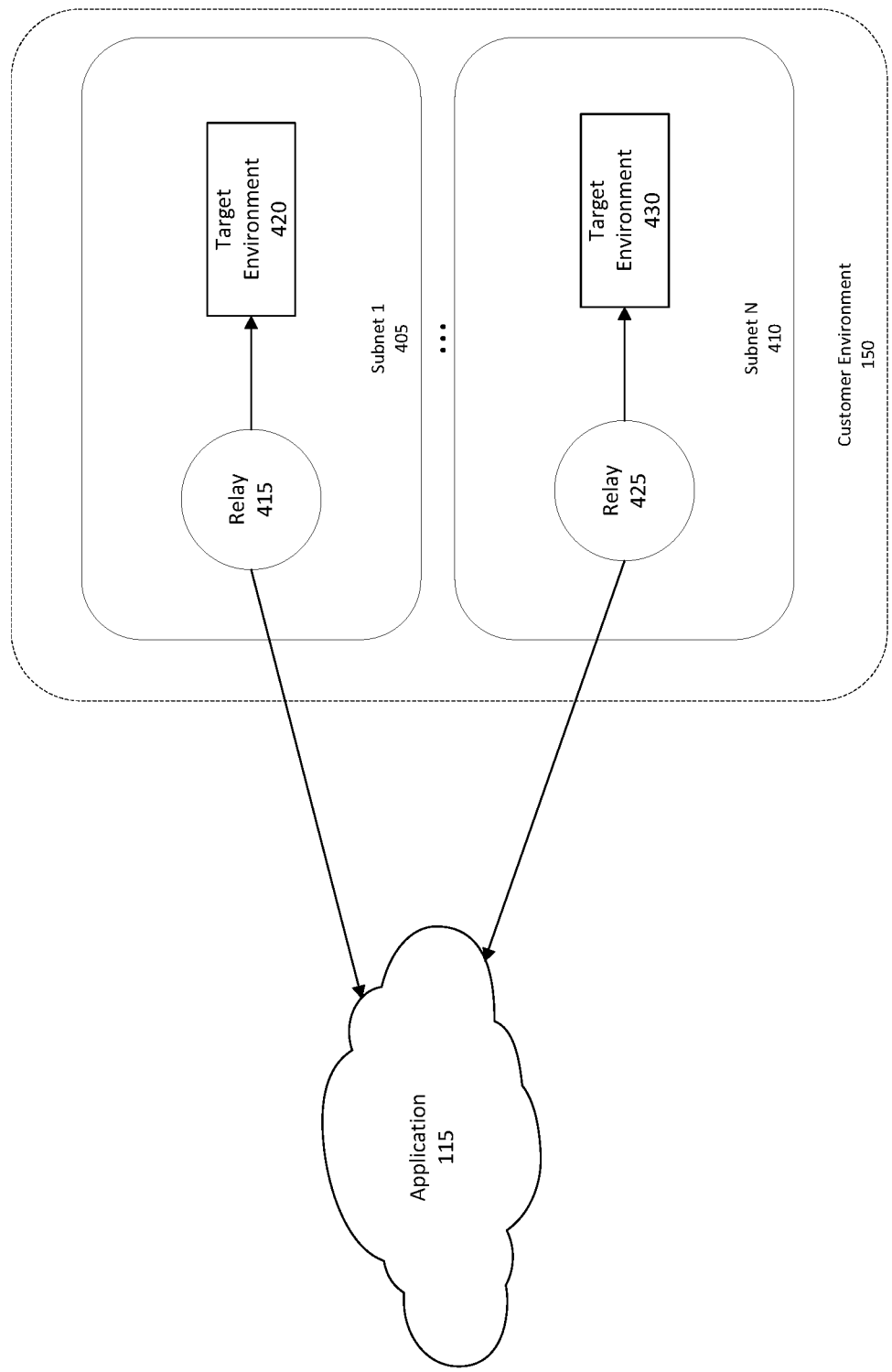
FIG. 4 shows a block diagram of subnets in an embodiment of a blockchain incentive intrusion detection system.

FIG. 4 shows a block diagram of subnets in an embodiment of an incentivized intrusion detection system. As shown in FIG. 4, the application 115 may reside in the cloud. The application 115 may be in communication with relays 415, 425 present on subnets 405, 410, respectively. The subnets may be present in a client system 150. Each subnet 405, 410 may have a target environment 420, 430, respectively. Each subnet 405, 410 may cover a different area of the client system 150 in some embodiments. Although shown and described as having two subnets 405, 410, it is contemplated that any number of subnets having any number of target environments may be present in the client system 150.

Figure 5:
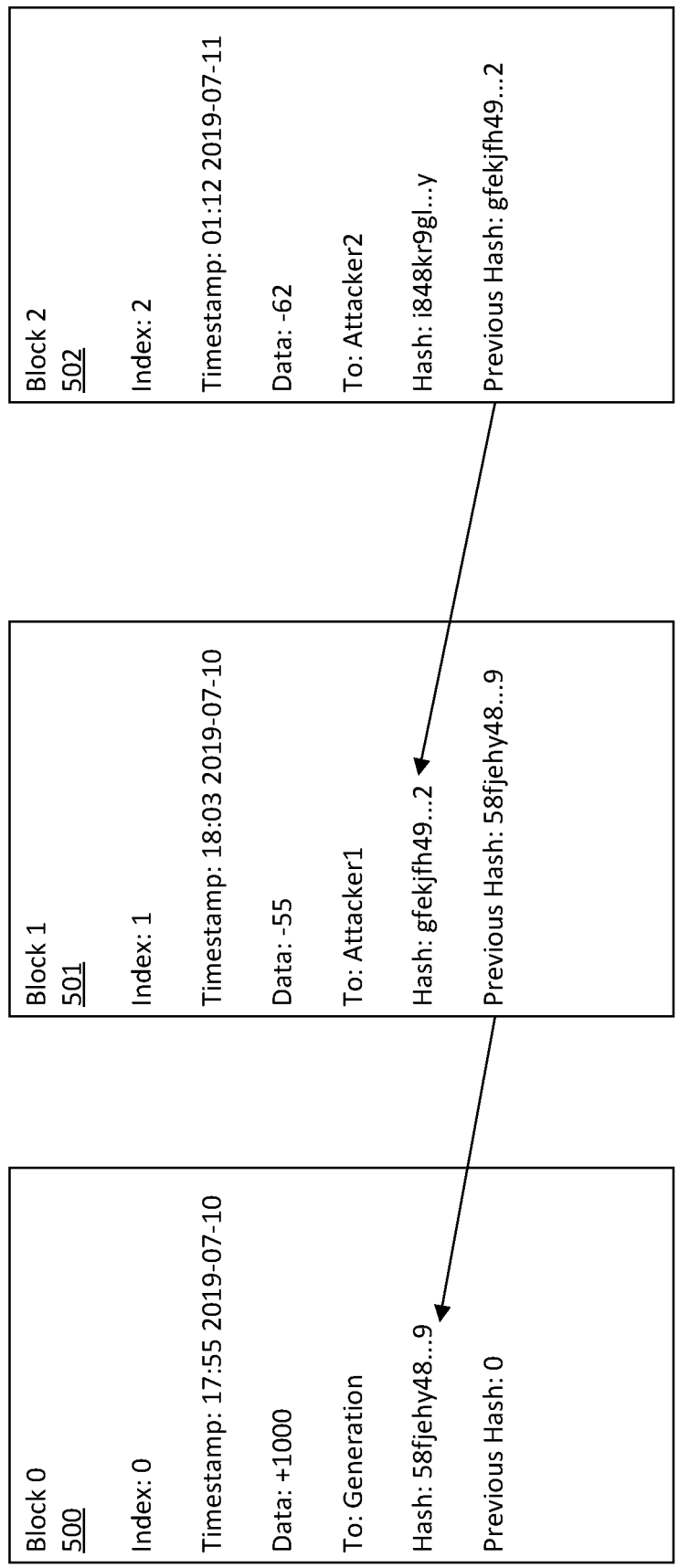
FIG. 5 shows a representation of blocks in a blockchain in an embodiment of a blockchain incentive intrusion detection system.

FIG. 5 shows a representation of blocks in a blockchain in one example embodiment of an incentivized intrusion detection system. As used herein, the term "blockchain" may be used as an example of a "distributed ledger". An exemplary blockchain suitable for the purposes described herein may be Ethereum, which may be used for smart contracts. Smart contracts may run on blockchains to ensure permanent storage of their data and extreme difficulty with which their data can be tampered or altered. In some embodiments, a smart contract may be run by executing a script, validating the outcome of the script, and storing the smart contract and its result in a block. In general, a block may include an increasing block number, a hash, a reference to the immediately preceding block, a proof-of-work, and/or one or more transactions of executed smart contracts. In some examples, a block may also include a timestamp, a nonce, and identifiers related to a sender and/or a recipient.

For example, FIG. 5 illustrates three consecutive blocks of a blockchain: block 0 500, block 1 501, and block 2 502. Taking block 0 500 as an example, the block includes an index (0), which increases as subsequent blocks are created. For example, block 1 501's index is 1 and block 2 502's index is 2. Block 0 500 further includes a timestamp representing its date and time of creation. As shown, blocks with later indices may have timestamps later in date and/or time than previous blocks. Block 0 500 also includes data; in this case, block 0 500 represents a funding event of +1000 to generate digital storage. Block 0 500 also may include a hash of its data and a previous hash. In this case, the previous hash may be 0 because block 0 500 is the first block of the blockchain.

Block 1 501, on the other hand, represents a subsequent block in the blockchain. Block 1 501 represents the claiming of an incentive through a smart contract associated with the blockchain (e.g., a smart contract associated with a first stage of a bounty). Specifically, block 1 501 indicates a detriment in value of the +1000 digital storage by −55. Block 1 501 may further indicate an identifier of the claimant; specifically, Attacker1. Block 1 501 may further include a hash of its data, as well as the hash of block 0 500.

Similarly, block 2 502 represents a subsequent block in the blockchain that occurred at a timestamp after block 1 501. Block 2 502 represents the claiming of another incentive through another smart contract associated with the blockchain (e.g., a smart contract associated with a second stage of the bounty). Specifically, block 2 502 indicates a detriment in value of the +945 digital storage by −62. Block 2 502 may further indicate an identifier of the claimant; specifically, Attacker2. In some cases, the claimant can include the same claimant (Attacker1) as that of the incentive associated with Block1 501. Block 2 502 may further include a hash of its data, as well as the hash of block 1 501. By including a hash of each block's previous block in the current block, the blockchain becomes unbreakable and immutable, providing for a number of security benefits.

Figure 6:
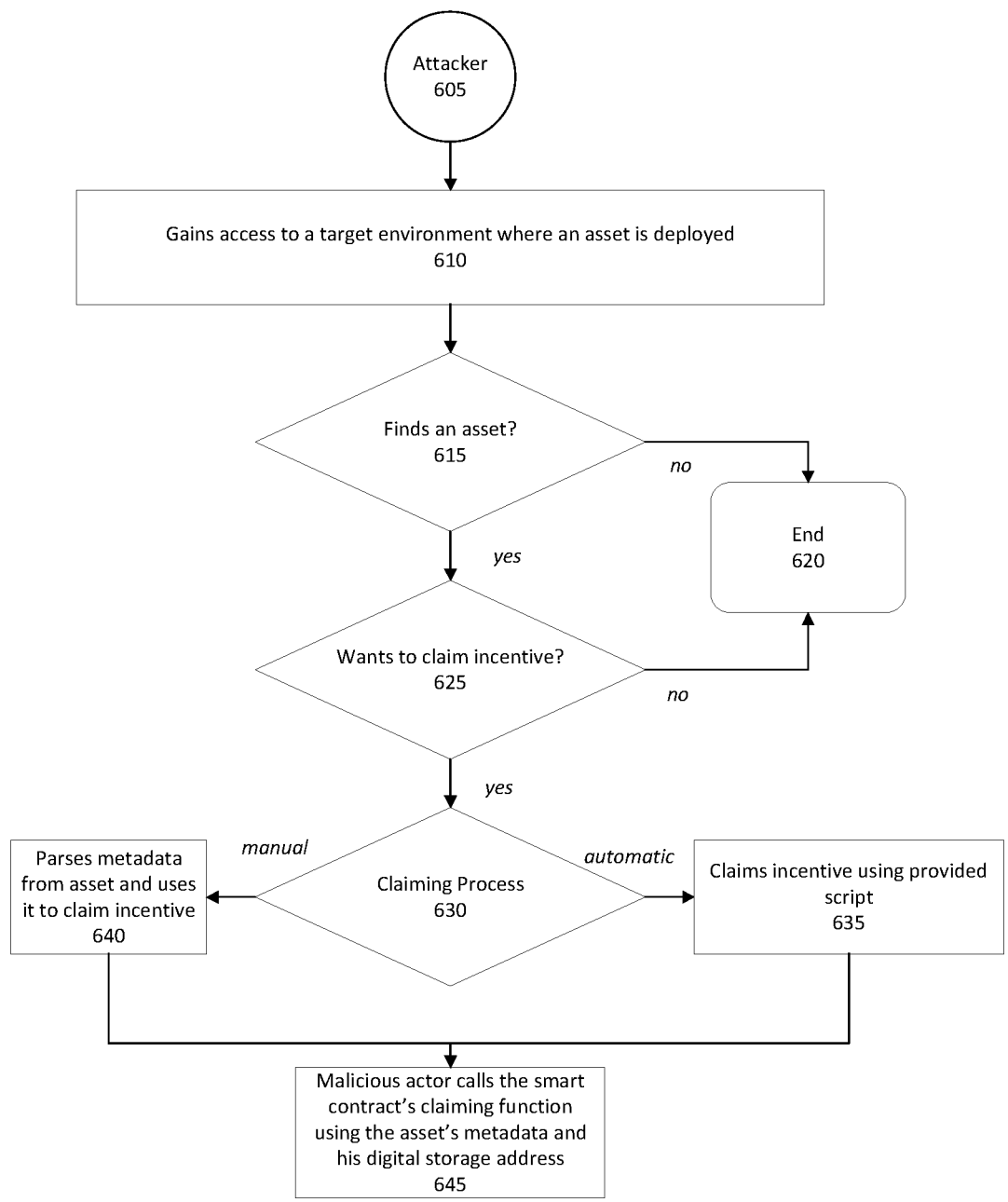
FIG. 6 shows a flow diagram of an malicious actor's action in a blockchain incentive intrusion detection system according to some embodiments.

FIG. 6 shows a flow diagram of an attacker's action in an incentivized intrusion detection system according to some embodiments. After a client creates a bounty, one or more assets may be deployed on one or more target environments and one or more smart contracts may be provisioned on the distributed ledger. The system may be waiting on a malicious actor to find an asset and claim the incentive using the following process, which may be performed in a target environment. The target environment may be any online or offline digital environment, such as a company's network or any other location where a malicious actor can gain access and where an asset may be deployed.

At step 610, a malicious actor 605 may gain access to a target environment where an asset is deployed. At step 615, it is determined whether the malicious actor 605 finds an asset. If the malicious actor 605 does not find an asset, the process ends at step 620. If the malicious actor 605 does find an asset, it is determined whether the malicious actor 605 wants to claim the incentive at step 625. When the malicious actor 605 finds an asset, the asset may include the information required to understand what its purpose is and how to use it. For example, the asset may include text providing various information (e.g., explanations on what the asset is, explanations on how to verify that the incentive is there and can be claimed using the required metadata, explanations on how to claim the incentive, explanations on any next stage, such as where to find it, etc.), a proposed script to claim the incentive, and the required metadata to find the associated smart contract and claim the incentive. The malicious actor 605 may be informed in the text that digital storage is required to receive the funds. The asset may be deployed on a target environment in such a way that its discovery is made easy for a malicious actor 605. In addition, verifying the authenticity of the asset may be relatively straightforward for the malicious actor 605.

If the malicious actor 605 does not want to claim the incentive, the process ends at step 620. The decision to claim the incentive may be up to the malicious actor 605. It is up to the client to provide an adequate incentive to incite the malicious actor 605 to reveal itself. In some embodiments, the system described herein can to help with decision making by proposing an adequate incentive based on several parameters and statistics. For example, the system may apply artificial intelligence or machine learning to decide what amount of incentive is likely to attract a malicious actor 605. The goal may be to provide an adequate incentive compared to the difficulty of the malicious actor 605 to compromise the target environment where the asset may be found. This may depend on how the customer values its data and information technology systems. In addition, statistics may be used from previous bounties, bounties from other customers, and/or the like. Parameters may include number of central processing units (CPUs), random access memory (RAM), and disk memory, number of processing running, environment where this target environment is, number of other information technology systems in the same subnet as this target environment, and/or the like.

If the malicious actor 605 does want to claim the incentive, it is determined at step 630 whether the claiming process should be automatic or manual based on whether the malicious actor 605 decides to use the provided script on the target environment or on another malicious actor-controlled machine. If the claiming process is manual, metadata is parsed from the asset and used to claim the incentive at step 640. For example, the malicious actor 605 may download the provided script from the website to claim the incentive. The script may require the digital storage of the malicious actor 605 and the path of the asset or its metadata. In another example, the malicious actor 605 may create his own script to claim the incentive by using the metadata in the asset. If the claiming process is automatic, the incentive may be claimed using the provided script (which includes the required metadata) at step 635. Manual claiming may be useful if the malicious actor 605 wants to claim the incentive from another machine.

Regardless of whether the claiming process is manual or automatic, the malicious actor 605 may call the smart contract's claiming function using the asset's metadata and his digital storage address at step 645. The asset's metadata may include, for example, the smart contract address, the asset identifier, a cryptographic nonce (e.g., an arbitrary number), the incentive amount, and the like. When the smart contract's function is called, the process may move to the distributed ledger where the smart contract exists and where its function is executed. Further steps are discussed with respect to FIG. 7.

Figure 7:
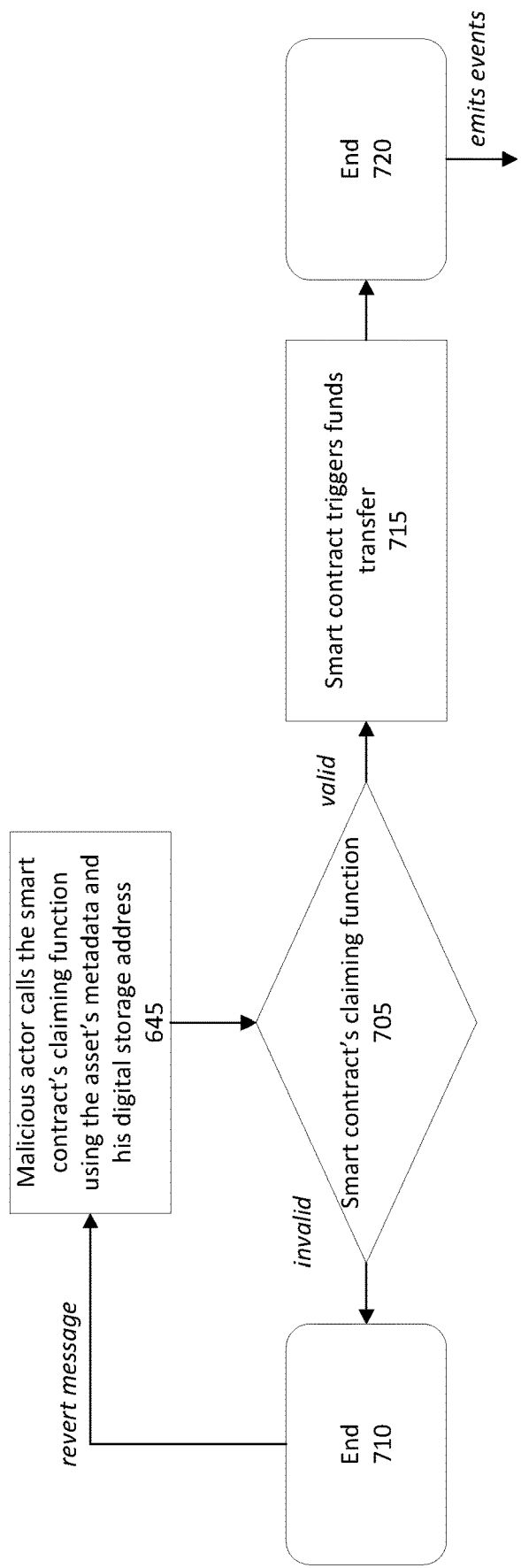
FIG. 7 shows a flow diagram of actions on a smart contract in a blockchain incentive intrusion detection system according to some embodiments.

FIG. 7 shows a flow diagram of actions on a smart contract in an incentivized intrusion detection system according to some embodiments. Once the malicious actor 605 calls the smart contract's claiming function using the asset's metadata and his digital storage address at step 645, it is determined whether the smart contract's claiming function is valid or invalid at step 705. This may be done by requesting that the malicious actor 605 provide the asset's metadata and the signature to the claiming function. The smart contract may verify the validity of the signature. The smart contract's claiming function may oversee the validation of the received asset's metadata. If the smart contract's claiming function is determined to be invalid at step 705, the process ends at step 710 and nothing further happens with respect to that attack. If the smart contract's claiming function is determined to be valid at step 705 (e.g., with valid metadata and a digital storage address), the smart contract may trigger a funds transfer at step 715. The funds specified in the smart contract may be transferred from the smart contract to the malicious actor 605's digital storage. The function may emit a claim success event. Functions on the smart contract may emit events when they are called. The most critical event may be the claim event which may raise a security alert. The different types of events emitted may be monitored by the activities monitoring engine 255. The process may then end at step 720.

Figure 8:
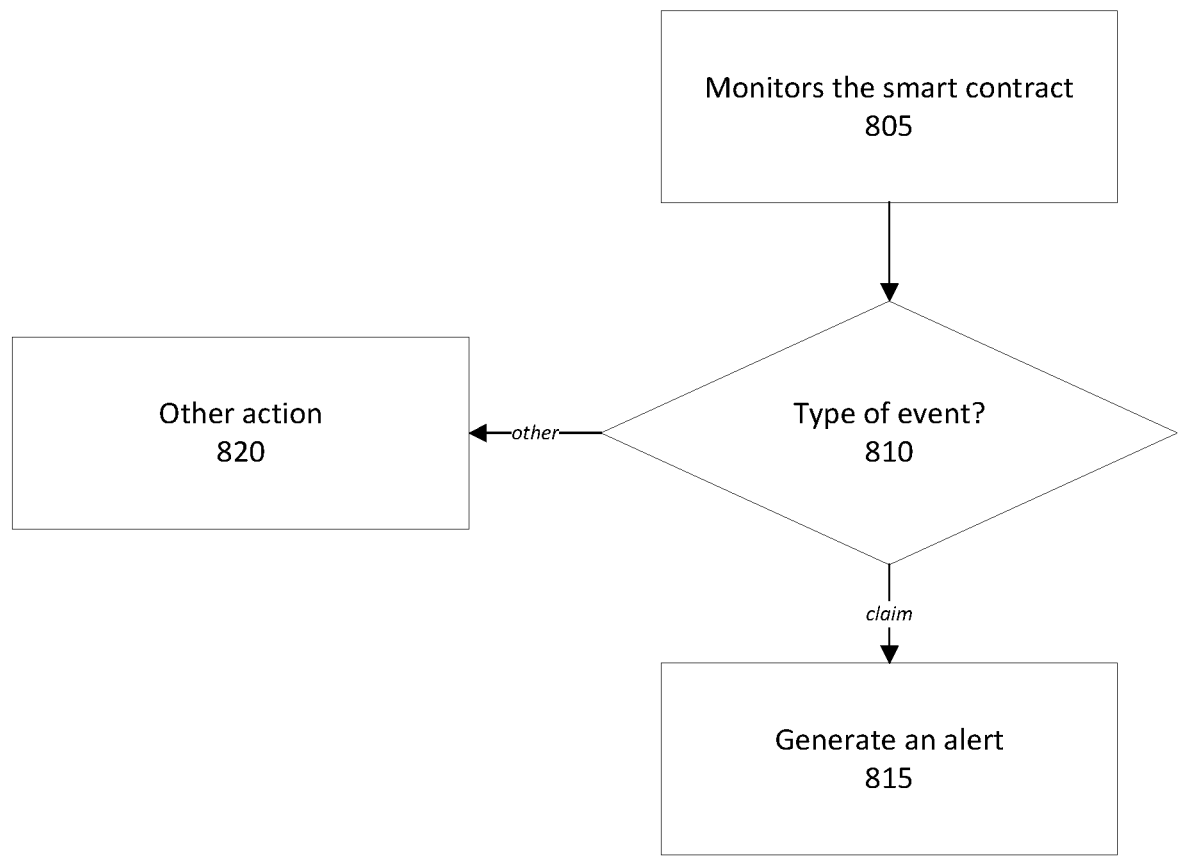
FIG. 8 shows a flow diagram of a blockchain incentive intrusion detection method according to some embodiments.

FIG. 8 shows a flow diagram of an incentivized intrusion detection method according to some embodiments. At the incentivized intrusion detection method, the smart contract may be monitored at step 805. At step 810, it is determined what type of event occurred. If the event was a claim of an incentive, an alert may be generated at step 815. If the event was another type of event (e.g., changing the contract owner, increment or decrement the contract balance, etc.), another action may be taken at step 820. For example, the other event may be logged, written to a database record, used to determine future incentives, assets, target environments, and the like, and/or fed to an artificial intelligence or a machine learning model.

Figure 9:
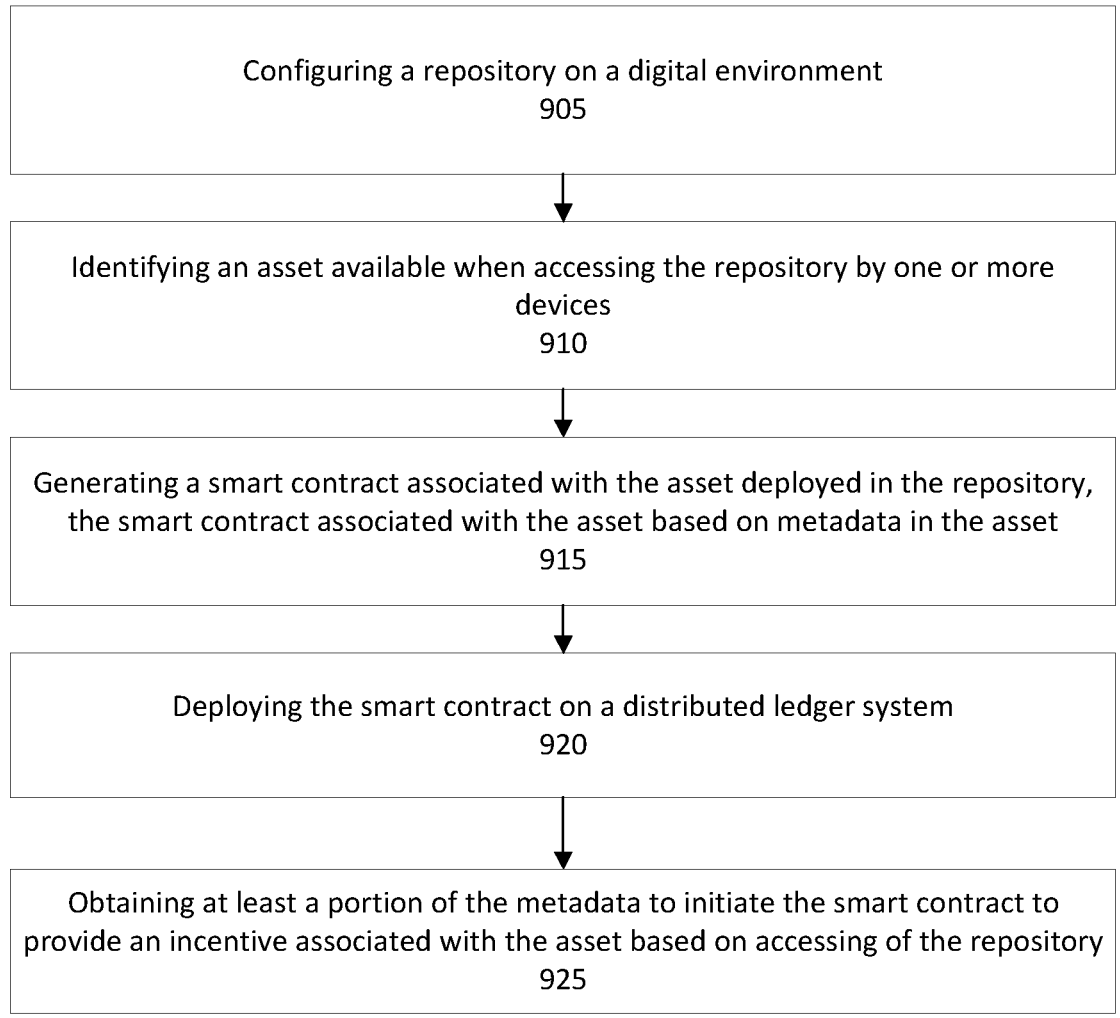
FIG. 9 is a flowchart of a blockchain incentive intrusion detection method according to some embodiments.

FIG. 9 is a flowchart of an incentivized intrusion detection method according to some embodiments. At step 905, a repository may be configured on a digital environment. In some embodiments, the repository may be a subnet. However, it is contemplated that the repository may be offline or online, and may include servers, networks, gateways, electronic devices, databases, and the like. It is contemplated that the digital environment may be a target environment, and may be included in a customer environment.

At step 910, an asset may be identified to incite a malicious actor to access the repository using one or more devices. In other words, an asset may be selected, provided, generated, or retrieved. In some embodiments, the asset may be identified based on a particular type of malicious actor to access the repository using one or more devices. A particular type of malicious actor may be targeted using the asset based on a level of knowledge, experience, or sophistication, a location of the malicious actor, a history of the malicious actor, or any other identifying features of the malicious actor. In some embodiments, the asset may be changed over time.

At step 915, a smart contract may be generated with the asset. The smart contract may be associated with the asset based on metadata in the asset. The asset may include the metadata and may be deployed to the repository. The asset may be used in conjunction with an incentive to cause one or more malicious actors to execute the smart contract. In some embodiments, the metadata may include a nonce, an identifier, an address, and a token amount. In some embodiments, the metadata may be hashed and signed with a private key. At step 920, the smart contract may be deployed on a distributed ledger system (e.g., one or more of the distributed ledgers described above). As used herein, a distributed ledger may include a blockchain.

At step 925, at least a portion of the metadata may be obtained to initiate the smart contract to provide an incentive associated with the asset based on the accessing of the repository. For example, an attacker may access the repository to gain access to the asset and provide at least some of the metadata (or other data) to the smart contract in order to do so. In some embodiments, at least the portion of the metadata may include a script that triggers the smart contract to provide the asset. In some embodiments, at least the portion of the metadata may be received from a device of the one or more devices. In some embodiments, an event may be generated based on the smart contract being triggered. For example, an alert may be generated, a log entry may be made, data may be saved to the database, or a transfer of funds may occur. In some embodiments, triggering the smart contract includes writing the providing of the asset to the distributed ledger.

In some examples, the processes described herein (e.g., process 900 and/or other process described herein) may be performed by a computing device or apparatus. In one example, the process 900 can be performed by the intrusion detection system described herein. In another example, the process 800 can be performed by a computing device with the computing system 1000 shown in FIG. 10. The computing device can include any suitable device, such as a mobile device (e.g., a mobile phone), a desktop computing device, a tablet computing device, a wearable device, a server computer, a television, and/or any other computing device with the resource capabilities to perform the processes described herein, including the process 900. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 900 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The incentivized intrusion detection system and techniques described herein can be used for various types of systems or platforms, such as Bug Bounty platforms, Capture the Flag (CTF) systems and Red-team/Blue-team events (where the tokens are used for scoring and are the proof of gaining access to the system), among others. In one illustrative example, the incentivized intrusion detection system and techniques can be used (e.g., white labeled) for Bug Bounty platforms. A Bug Bounty company provides a Bug Bounty platform that acts as an intermediary between customers (e.g., a company) that want to test applications, systems, and networks with respect to ethical hackers.

To implement the incentivized intrusion detection techniques, a Bug Bounty customer can download incentivized intrusion detection agents (e.g., software applications, such as application 115 in some illustrative examples) and install the agents on the application, the system, and/or the network that the customer wants to have tested. The agents can register themselves to an incentivized intrusion detection system administration platform. In one illustrative example, the system administration platform can include the application 115 or can be in communication with the application 115. The incentivized intrusion detection system administration platform allows the customer to create a bounty with one or more artefacts, as described herein. The one or more artefacts can then be pulled by the agents and placed at key locations within the application, system, and/or network of the customer.

The artefacts are identified on a private blockchain (e.g., a private Ethereum Blockchain) with a unique identifier and have a predefined amount of a reward token. The amount can be defined by the customer when the customer creates the artefact and the customer buys the desired amount from the Bug Bounty platform. In some cases, the reward token has no value outside of the Bug Bounty platform.

When an ethical hacker (e.g., selected by the Bug Bounty company and provided special access to the customer's environment) finds and claims an artefact using the provided scripts, the tokens are transferred to the hacker's account on the Bug Bounty platform. As described herein, the location of the artefact can be placed in a sensitive area of the application, system, and/or network. Therefore, gaining access to the artefact provides proof of the existence of a security vulnerability that was exploited. In some cases, the tokens can be used for ranking hackers, and allow hackers to exchange them against real monetary rewards.

As described in more detail herein, artefacts can have multiple stages. For example, a second stage of each artefact can contain another, larger, amount of tokens. The second stage can be claimed by hackers when they submit additional information, such as a report detailing the methods used to gain access to the location where the artefact exists. For example, the report can reviewed by the Bug Bounty company and/or the customer and validated. After approval, the tokens can be liberated and automatically transferred to the ethical hacker. Advantages of the incentivized intrusion detection techniques for a Bug Bounty company, for example, include providing a simple way to manage scoring, manage payment from customers and to hackers, fewer conflicts between a company and hackers as claims from the latter cannot be refuted, among others. An example of an advantage of the incentivized intrusion detection techniques for ethical hackers include that, when finding an artefact, an ethical hacker is certain that they will get paid (or receive some other incentive) by the company. An example of an advantage of the incentivized intrusion detection techniques for the customers is that they can be sure that the hacker's claim is correct.

Figure 10:
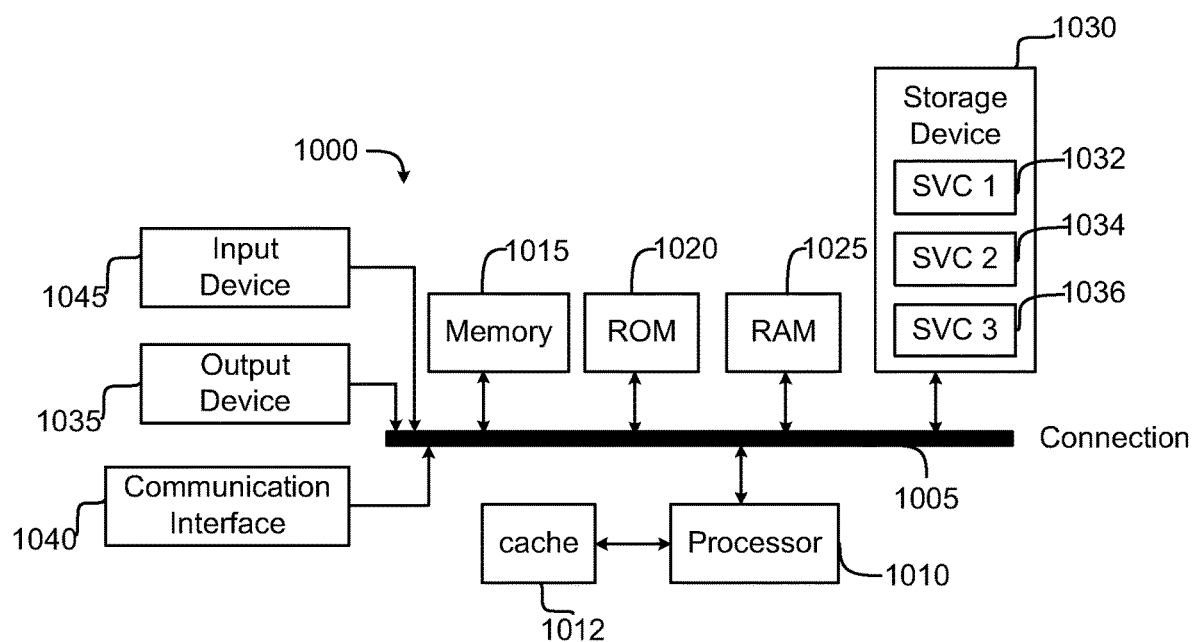
FIG. 10 is a block diagram illustrating an example of a computing system architecture, in accordance with some examples.

FIG. 10 illustrates an architecture of a computing system 1000 wherein the components of the system 1000 are in electrical communication with each other using a connection 1005, such as a bus. Exemplary system 1000 includes a processing unit (CPU or processor) 1010 and a system connection 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the actual processor design. The processor 1010 may be a completely self-contained computing system, containing multiple cores or processors, a bus, memory controller, cache, etc. A multi-core processor may be symmetric or asymmetric.

To enable client interaction with the computing system 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a client to provide multiple types of input to communicate with the computing system 1000. The communications interface 1040 can generally govern and manage the client input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include services 1032, 1034, 1036 for controlling the processor 1010. Other hardware or software modules are contemplated. The storage device 1030 can be connected to the system connection 1005. In one aspect, a hardware module that performs a particular function can include the software component stored in a computer-readable medium in connection with the necessary hardware components, such as the processor 1010, connection 1005, output device 1035, and so forth, to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the concepts in this disclosure may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" or "one or more of" a set indicates that one member of the set or multiple members of the set satisfy the claim. For example, claim language reciting "at least one of A and B" means A, B, or A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules.

Example 1: A method of deploying one or more smart contracts. The method includes: configuring a repository in a digital environment; identifying an asset available when accessing the repository by one or more devices; generating a smart contract associated with the asset deployed in the repository, the smart contract associated with the asset based on metadata in the asset; deploying the smart contract on a distributed ledger system; and obtaining at least a portion of the metadata to initiate the smart contract to provide an incentive associated with the asset based on accessing of the repository.

Example 2: A method according to Example 1, further comprising providing data to the smart contract to validate provisioning of the incentive.

Example 3: A method according to any of Examples 1 or 2, wherein at least the portion of the metadata includes a script that initiates the smart contract to provide the incentive.

Example 4: A method according to any of Examples 1 to 3, wherein at least the portion of the metadata is received from a device of the one or more devices.

Example 5: A method according to any of Examples 1 to 4, further comprising generating an event based on the smart contract being initiated.

Example 6: A method according to any of Examples 1 to 5, wherein triggering the smart contract includes writing the providing of the incentive to the distributed ledger system.

Example 7: A method according to any of Examples 1 to 6, wherein the metadata includes a nonce, an identifier, an address, and a token amount.

Example 8: A method according to any of Examples 1 to 7, wherein the metadata is hashed and signed with a private key.

Example 9: A method according to any of Examples 1 to 8, wherein the asset is changed over time.

Example 10: A computer-program product tangibly embodied in a non-transitory machine-readable storage medium, including instructions that, when executed by one or more processors, cause the one or more processors to perform operations including: configuring a repository in a digital environment; identifying an asset available when accessing the repository by one or more devices; generating a smart contract associated with the asset deployed in the repository, the smart contract associated with the asset based on metadata in the asset; deploying the smart contract on a distributed ledger system; and obtaining at least a portion of the metadata to initiate the smart contract to provide an incentive associated with the asset based on accessing of the repository.

Example 11: A computer-program product according to Example 10, further comprising providing data to the smart contract to validate provisioning of the incentive.

Example 12: A computer-program product according to any of Examples 10 or 11, wherein at least the portion of the metadata includes a script that initiates the smart contract to provide the incentive.

Example 13: A computer-program product according to any of Examples 10 to 12, wherein at least the portion of the metadata is received from a device of the one or more devices.

Example 14: A computer-program product according to any of Examples 10 to 13, further comprising generating an event based on the smart contract being initiated.

Example 15: A computer-program product according to any of Examples 10 to 14, wherein triggering the smart contract includes writing the providing of the incentive to the distributed ledger system.

Example 16: A computer-program product according to any of Examples 10 to 15, wherein the metadata includes a nonce, an identifier, an address, and a token amount.

Example 17: A computer-program product according to any of Examples 10 to 16, wherein the metadata is hashed and signed with a private key.

Example 18: A computer-program product according to any of Examples 10 to 17, wherein the asset is changed over time.

Example 19: A system comprising one or more processors and one or more non-transitory machine-readable storage media containing instructions that, when executed on the one or more processors, cause the one or more processors to perform operations including: configuring a repository in a digital environment; identifying an asset available when accessing the repository by one or more devices; generating a smart contract associated with the asset deployed in the repository, the smart contract associated with the asset based on metadata in the asset; deploying the smart contract on a distributed ledger system; and obtaining at least a portion of the metadata to initiate the smart contract to provide an incentive associated with the asset based on accessing of the repository.

Example 20: A system according to Example 19, further comprising providing data to the smart contract to validate provisioning of the incentive.

Example 21: A system according to any of Examples 19 or 20, wherein at least the portion of the metadata includes a script that initiates the smart contract to provide the incentive.

Example 22: A system according to any of Examples 19 to 21, wherein at least the portion of the metadata is received from a device of the one or more devices.

Example 23: A system according to any of Examples 19 to 22, further comprising generating an event based on the smart contract being initiated.

Example 24: A system according to any of Examples 19 to 23, wherein triggering the smart contract includes writing the providing of the incentive to the distributed ledger system.

Example 25: A system according to any of Examples 19 to 24, wherein the metadata includes a nonce, an identifier, an address, and a token amount.

Example 26: A system according to any of Examples 19 to 25, wherein the metadata is hashed and signed with a private key.

Example 27: A system according to any of Examples 19 to 26, wherein the asset is changed over time.

What is claimed is:

1. A method comprising:
configuring a repository in a digital environment;
identifying an asset stored on the repository, wherein the asset is accessible by one or more devices;
generating a smart contract associated with the asset deployed in the repository, wherein the smart contract is based on metadata related to the asset stored on the repository;
deploying the smart contract on a distributed ledger system;
based on accessing of the asset in the repository by at least one device, obtaining at least a portion of the metadata to initiate the smart contract to provide an incentive associated with the asset; and
detecting an intrusion of the digital environment based on initiation of the smart contract.

2. The method of claim 1, further comprising:
providing data to the smart contract to validate provisioning of the incentive.

3. The method of claim 1, wherein at least the portion of the metadata includes a script that initiates the smart contract to provide the incentive.

4. The method of claim 1, wherein at least the portion of the metadata is received from a device of the one or more devices.

5. The method of claim 1, wherein triggering the smart contract includes writing the providing of the incentive to the distributed ledger system.

6. The method of claim 1, wherein the metadata includes a nonce, an identifier, an address, and a token amount.

7. The method of claim 1, wherein the metadata is hashed and signed with a private key.

8. The method of claim 1, wherein the asset is changed over time.

9. The method of claim 1, further comprising:
generating, based on initiation of the smart contract, an alert associated with the intrusion of the digital environment.

10. A computer-program product tangibly embodied in a non-transitory machine-readable storage medium, including instructions that, when executed by one or more processors, cause the one or more processors to perform operations including:
configuring a repository in a digital environment;
identifying an asset stored on the repository, wherein the asset is accessible by one or more devices;
generating a smart contract associated with the asset deployed in the repository, wherein the smart contract is based on metadata related to the asset stored on the repository;
deploying the smart contract on a distributed ledger system;
based on accessing of the asset in the repository by at least one device, obtaining at least a portion of the metadata to initiate the smart contract to provide an incentive associated with the asset; and
detecting an intrusion of the digital environment based on initiation of the smart contract.

11. The computer-program product of claim 10, wherein the operations further include:
providing data to the smart contract to validate provisioning of the incentive.

12. The computer-program product of claim 10, wherein at least the portion of the metadata includes a script that initiates the smart contract to provide the incentive.

13. The computer-program product of claim 10, wherein triggering the smart contract includes writing the providing of the incentive to the distributed ledger system.

14. The computer-program product of claim 10, wherein the asset is changed over time.

15. The computer-program product of claim 10, further comprising instructions that, when executed by the one or more processors, cause the one or more processors to perform operations including:
generating, based on initiation of the smart contract, an alert associated with the intrusion of the digital environment.

16. A system comprising:
one or more processors; and
one or more non-transitory machine-readable storage media containing instructions that, when executed on the one or more processors, cause the one or more processors to perform operations including:
configuring a repository in a digital environment;
identifying an asset stored on the repository, wherein the asset is accessible by one or more devices;
generating a smart contract associated with the asset deployed in the repository, wherein the smart contract is based on metadata related to the asset stored on the repository;
deploying the smart contract on a distributed ledger system;
based on accessing of the asset in the repository by at least one device, obtaining at least a portion of the metadata to initiate the smart contract to provide an incentive associated with the asset; and
detecting an intrusion of the digital environment based on initiation of the smart contract.

17. The system of claim 16, wherein the operations further include:
providing data to the smart contract to validate provisioning of the incentive.

18. The system of claim 16, wherein at least the portion of the metadata includes a script that initiates the smart contract to provide the incentive.

19. The system of claim 16, wherein triggering the smart contract includes writing the providing of the incentive to the distributed ledger system.

20. The system of claim 16, wherein the one or more non-transitory machine-readable storage media further include instructions that, when executed on the one or more processors, cause the one or more processors to perform operations including:
generating, based on initiation of the smart contract, an alert associated with the intrusion of the digital environment.

* * * * *

UNITED STATES PATENT AND TRADEMARK OFFICE
CERTIFICATE OF CORRECTION

PATENT NO. : 11,489,854 B2  
APPLICATION NO. : 16/936014  
DATED : November 1, 2022  
INVENTOR(S) : Pierre Dumont et al.

Page 1 of 1

It is certified that error appears in the above-identified patent and that said Letters Patent is hereby corrected as shown below:

On the Title Page

In the Inventors Section, Item (72), please delete:
"Riccardo Sueca, Cheseaux (CH)"

And insert:
--Riccardo Succa, Cheseaux (CH)--

Signed and Sealed this
Twenty-fourth Day of January, 2023

Katherine Kelly Vidal
*Director of the United States Patent and Trademark Office*